US008449097B2

(12) United States Patent
Nishimura et al.

(10) Patent No.: US 8,449,097 B2
(45) Date of Patent: *May 28, 2013

(54) AQUEOUS PIGMENT DISPERSION, INK COMPOSITION, AND IMAGE FORMING METHOD

(75) Inventors: Naoko Nishimura, Kanagawa (JP); Misato Sasada, Kanagawa (JP); Tomoko Kuwabara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 360 days.

This patent is subject to a terminal disclaimer.

(21) Appl. No.: 12/889,424

(22) Filed: Sep. 24, 2010

(65) Prior Publication Data

US 2011/0074867 A1    Mar. 31, 2011

(30) Foreign Application Priority Data

Sep. 25, 2009 (JP) .................. 2009-221362
Sep. 22, 2010 (JP) .................. 2010-212854

(51) Int. Cl.
*B41J 2/01* (2006.01)

(52) U.S. Cl.
USPC ............... 347/100; 347/95; 106/31.6

(58) Field of Classification Search
USPC .............. 347/100, 95, 96, 101, 88, 99, 21, 347/20, 9; 106/31.6, 31.13, 31.27; 523/160, 523/161
See application file for complete search history.

(56) References Cited

U.S. PATENT DOCUMENTS

| 6,439,708 | B1 * | 8/2002 | Kato et al. ............... 347/100 |
| 2005/0075418 | A1 | 4/2005 | Nishiguchi |
| 2007/0216743 | A1 * | 9/2007 | Makuta et al. ............ 347/100 |
| 2008/0055385 | A1 | 3/2008 | Houjou |
| 2009/0088521 | A1 * | 4/2009 | Hosokawa et al. ....... 524/558 |
| 2009/0202723 | A1 * | 8/2009 | Ikoshi et al. .............. 106/31.13 |
| 2009/0202724 | A1 | 8/2009 | Arai et al. |
| 2009/0203833 | A1 | 8/2009 | Sasada et al. |
| 2009/0208652 | A1 | 8/2009 | Sasada et al. |
| 2011/0057987 | A1 | 3/2011 | Inushima et al. |

FOREIGN PATENT DOCUMENTS

| EP | 1555274 | | 7/2005 |
| EP | 2090626 | A1 | 8/2009 |
| EP | 2096150 | A2 | 9/2009 |
| EP | 2221351 | A1 | 8/2010 |
| JP | 2005-133089 | | 5/2005 |
| JP | 2006-176623 | A | 7/2006 |
| JP | 2006-342201 | | 12/2006 |
| JP | 4109713 | B2 | 7/2008 |
| JP | 2009-084494 | A | 4/2009 |
| WO | 2006/074483 | A1 | 7/2006 |
| WO | 2007-130561 | | 11/2007 |
| WO | WO 2009001967 | A1 * | 12/2008 |
| WO | 2009/085166 | A1 | 7/2009 |

* cited by examiner

*Primary Examiner* — Manish S Shah
(74) *Attorney, Agent, or Firm* — SOLARIS Intellectual Property Group, PLLC

(57) ABSTRACT

An aqueous pigment dispersion including: (A) a pigment; (B) a dispersion polymer having a neutralization degree of from 50% to 90% and a solubility of from 0.2 g to 0.8 g per 5 ml of water (25° C.), and containing an acidic group and a hydrophobic structural unit (a) having an aromatic ring linked via a linking group to an atom included in a main chain, a content ratio of the aromatic ring being from 10% by mass to less than 20% by mass based on a total mass of the polymer; and (C) a water-based liquid medium.

11 Claims, No Drawings

AQUEOUS PIGMENT DISPERSION, INK COMPOSITION, AND IMAGE FORMING METHOD

CROSS-REFERENCE TO RELATED APPLICATION

This application claims priority under 35 USC 119 from Japanese Patent Application No. 2009-221362 filed on Sep. 25, 2009 and Japanese Patent Application No. 2010-212854 filed on Sep. 22, 2010, the disclosures of which are incorporated by reference herein.

BACKGROUND OF THE INVENTION

1. Field of the Invention

The present invention relates to an aqueous pigment dispersion containing a pigment as a coloring material, and an ink composition and an image forming method using the same.

2. Description of the Related Art

In recent years, water dispersions in which water-insoluble solids, such as pigments, are dispersed are frequently utilized for an inkjet recording ink and the like.

Water-based inks for inkjet recording has been required to have, as the quality, long-term stability in water resistance, lightfastness, stability over time of the dispersed particle diameter or precipitation stability during storage of dispersed particles, such as pigments dispersed and contained, or the like. In large-sized recording devices, such as an inkjet system for industrial application, an ink tank to be placed in the system is also large. Thus, after charging an ink, it is practically difficult to use the ink while shaking and mixing the ink according to the use timing. In such a system, long-term stability is particularly required, and it is essential for the ink stored in the tank to have stability for preventing precipitation. However, in the actual circumstances, most water-based inks are remarkably inferior to oil-based inks in terms of suitability with regard to pigment dispersibility and the like, and satisfactory quality is not obtained in respect of long-term storage stability or the like.

In order to solve such a problem, a water dispersion in which a pigment is coated with a resin having a polyether structure and having an acid value of 5 to 70 mgKOH/g has been proposed, for example (e.g., Japanese Patent No. 4109713). Moreover, an ink utilizing a pigment dispersion containing a water-insoluble vinyl polymer having an arylalkyl group or an aryl group and a pigment having a quinacridone skeleton has been proposed (e.g., Japanese Patent Application Laid-Open (JP-A) No. 2006-176623). Furthermore, recently, a water-based colored dispersion containing a polymer having a benzene ring indirectly linked to the main chain and having an acid value of from 10 mgKOH/g to less than 85 mgKOH/g has been proposed (e.g., JP-A No. 2009-84494).

However, also in any of the above techniques, long-term stability of the pigment dispersion or the inkjet recording ink is still insufficient, and when images are formed using the inks, there is a problem that a white deletion defect arises in the images.

SUMMARY OF THE INVENTION

According to an aspect of the invention, there is provided an aqueous pigment dispersion including: (A) a pigment; (B) a dispersion polymer having a neutralization degree of from 50% to 90% and a solubility of from 0.2 g to 0.8 g per 5 ml of water (25° C.), and containing an acidic group and a hydrophobic structural unit (a) having an aromatic ring linked via a linking group to an atom included in a main chain, a content ratio of the aromatic ring being from 10% by mass to less than 20% by mass based on a total mass of the polymer; and (C) a water-based liquid medium.

DETAILED DESCRIPTION OF THE INVENTION

The present inventors have found that, by using a partially neutralized dispersant that is not water insoluble but has a water solubility, the precipitation of a pigment is prevented and dispersion stability over time is maintained, and the invention has been accomplished based on the finding.

Hereinafter, an aqueous pigment dispersion and an ink composition and an image forming method using the same of the invention will be described in detail.

<Aqueous Pigment Dispersion>

An aqueous pigment dispersion of the invention (hereinafter sometimes simply referred to as a "pigment dispersion" or a "pigment dispersion liquid") contains at least (A) a pigment; (B) a dispersion polymer having a neutralization degree of from 50% to 90% and a solubility of from 0.2 g to 0.8 g per 5 ml of water (25° C.), and containing an acidic group and a hydrophobic structural unit (a) having an aromatic ring linked via a linking group to an atom included in a main chain, a content ratio of the aromatic ring being from 10% by mass to less than 20% by mass based on a total mass of the polymer; and (C) a water-based liquid medium. The aqueous pigment dispersion of the invention may further contain other components, such as a surfactant, as required.

With a pigment dispersion liquid using a water insoluble dispersant or an ink composition prepared using the same, high-quality images having high water resistance and weatherability of images and less bleeding are generally obtained, but it is difficult to maintain dispersion stability over time, such as prevention of precipitation of the pigment (particularly yellow pigment) present in the liquid as dispersed particles. As a result, when formed into a water-based ink, there is a tendency that jetting properties and image abrasion resistance are greatly influenced. In the invention, by using a partially neutralized dispersion polymer having a water solubility which is not completely water soluble and not completely water insoluble, high dispersion stability over time of the dispersed particles, particularly pigment (particularly yellow pigment), can be maintained. Thus, even when a large amount of the ink composition is stored at once in a large-sized tank, e.g., a large-sized device, a precipitation phenomenon is prevented and the ink composition can be stably held for a long period of time. In particular, it is effective for the case where the acid value of the dispersion polymer is high (preferably when the acid value is from 85 mgKOH/g to 165 mgKOH/g) and further for the case where the dispersion polymer in this case is a polymer obtained by a phase inversion emulsification method. Thus, when an ink composition is prepared and images are formed, excellent images in which the occurrence of a white deletion defect is prevented can be formed.

(A) Pigment

The aqueous pigment dispersion of the invention contains at least one pigment as a coloring material. The pigment may be any of organic pigments or inorganic pigments.

Examples of the organic pigments include azo pigments, polycyclic pigments, dye chelates, nitro pigments, nitroso pigments, and aniline black. Among them, the azo pigments and polycyclic pigments are preferable. Examples of the azo pigments include azo lake, insoluble azo pigments, condensed azo pigments, and chelate azo pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, and quinophthalone pigments. Examples of the dye chelates include basic dye chelates and acidic dye chelates.

Among the organic pigments, an azo yellow pigment is preferable in that the precipitation prevention effect after dispersion is high and dispersion stabilization after a long period of time is remarkable. Examples of the azo yellow pigment include pigment yellow 3, pigment yellow 12, pigment yellow 13, pigment yellow 74, and pigment yellow 83. In the invention, the pigment yellow 74 is particularly preferable.

Examples of the inorganic pigments include titanium oxide, iron oxide, calcium carbonate, barium sulfate, aluminum hydroxide, barium yellow, cadmium red, chrome yellow, and carbon black. Among the above, carbon black is particularly preferable. Examples of the carbon black include one manufactured by known methods, such as a contacting method, a furnace method, or a thermal method.

The pigment may be contained singly or in combination of two or more selected from the same group or different groups described above.

In the pigment dispersion of the invention, the pigment to be blended as a coloring material is covered with the following dispersion polymer, and then dispersed in a liquid. Thus, pigment particles can be made present with a fine particle diameter and, after dispersion, excellent dispersion stability in which precipitation is hard to occur is obtained. In this case, the entire pigment surface of the pigment is not necessarily covered with the dispersion polymer, and the particle surface may be at least partially covered with the dispersion polymer.

Specifically, from the viewpoint of liquid stability and jetting stability, the pigment is preferably dispersed in such a manner as to be obtained, for example, as an encapsulated pigment. The encapsulated pigment is a polymer emulsion obtained by blending a pigment in a dispersion polymer and, in detail, obtained by covering a pigment with a dispersion polymer having an acidic group, providing a resin layer on the pigment surface to make the pigment hydrophilic, and stably dispersing the pigment in water. Resin components for constituting the encapsulated pigment are not particularly limited and are preferably polymer compounds having a self-dispersion ability or dissolution ability in a mixed solvent of water and a water-soluble organic solvent and are preferably dissolved in an organic solvent to form a solution. In usual, the resin components have preferably a number average molecular weight in the range of about 1000 to about 100000 and particularly preferably in the range of about 3000 to 50000. When the number average molecular weight of the resin components is within the range, it is suitable for demonstrating a function as a coating film of pigment or a coating film when formed into an ink.

The details of the dispersion polymer of the invention will be described later.

The encapsulated pigment can be manufactured by conventionally known physical and chemical methods. For example, the encapsulated pigment can be manufactured by the method described in JP-A Nos. 9-151342, 10-140065, 11-209672, 11-172180, 10-25440, or 11-43636. Specific examples include the phase inversion emulsification method and the acid deposition method described in each of JP-A Nos. 9-151342 and 10-140065. In particular, the phase inversion emulsification method is preferable in terms of dispersion stability.

The phase inversion emulsification method is basically a self-dispersion (phase inversion emulsification) method including dispersing a mixed melt of a resin having a self-dispersion ability or dissolution ability and a pigment in water. The mixed melt may contain the curing agent or polymer compound. Here, the mixed melt refers to one having any of a mixed state without being dissolved, a dissolved and mixed state, or both the states. Examples of a more specific production process of the "phase inversion emulsification method include the method described in JP-A No. 10-140065. Examples of a more specific method of the phase inversion emulsification method include the method described in each of JP-A Nos. 9-151342 and 10-140065.

The content of the pigment in the pigment dispersion is preferably 1 to 10% by mass, more preferably 2 to 8% by mass, and particularly preferably 2 to 6% by mass, based on the total mass of the pigment dispersion, from the viewpoint of coloring properties, granular properties, ink stability, and jetting reliability. The pigment may be used singly or in combination of a plurality of members selected from the same group or different groups described above.

(B) Dispersion Polymer

The aqueous pigment dispersion of the invention contains at least one dispersion polymer having a neutralization degree of from 50% to 90% and a solubility of from 0.2 g to 0.8 g per 5 ml of water (25° C.), and containing an acidic group and a hydrophobic structural unit (a) having an aromatic ring linked via a linking group to an atom included in a main chain, a content ratio of the aromatic ring being from 10% by mass to less than 20% by mass based on a total mass of the polymer.

In the invention, the pigment is preferably an encapsulated pigment in which the pigment surface is at least partially covered with the dispersion polymer having a neutralization degree of from 50% to 90% and a solubility of from 0.2 g to 0.8 g per 5 ml of water (25° C.), and containing an acidic group and a hydrophobic structural unit (a), e.g., a polymer emulsion in which a pigment is embraced in the dispersion polymer. More specifically, an embodiment is preferable in which a pigment is at least partially covered with the dispersion polymer to form a polymer layer on the pigment surface, so that it can be dispersed in water.

<Acidic Group>

The dispersion polymer in the invention has at least one acidic group. The acidic group is preferable from the viewpoint of the stability of an emulsion state or a dispersion state. The acidic group is preferably bonded to an atom included in a polymer main chain. The acidic group can be introduced to the main chain using monomers having an acidic group, for example.

Examples of the acidic group include a carboxyl group, a phosphoric acid group, and a sulfonic acid group. In particular, a carboxyl group is preferable from the viewpoint of dispersion stability when constituting an ink composition.

The dispersion polymer in the invention preferably has a structure containing a hydrophilic structural unit having an acidic group bonded to an atom included in the polymer main chain. The hydrophilic structural unit is not particularly limited insofar as it is derived from a monomer containing a hydrophilic group having an acidic group, and may be one derived from one monomer containing a hydrophilic group or may be one derived from two or more monomers containing a hydrophilic group.

The hydrophilic group-containing monomer is preferably an acidic group-containing monomer and more preferably an acidic group-containing monomer having an acidic group and an ethylenically unsaturated bond. Examples of the acidic group-containing monomer include an unsaturated carboxylic acid monomer, an unsaturated sulfonic acid monomer, and an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxy methyl succinic acid. Examples of the unsaturated sulfonic acid monomer include styrene sulfonic acid, 2-acrylamide-2-methylpropane sulfonic acid, 3-sulfopropyl (meth)acrylate, and bis-(3-sulfopropyl)-itaconic acid ester. Examples of the unsaturated phosphoric acid monomer include vinyl phosphonic acid, vinyl phosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate. Among the acidic group-containing monomers, the unsaturated carboxylic acid monomer is preferable and acrylic acid and methacrylic acid are more preferable from the viewpoint of the dispersion stability and the jetting stability.

As other hydrophilic structural units other than the above, a structural unit derived from a monomer having a nonionic hydrophilic group can be used. The monomer for forming the structural unit having a nonionic hydrophilic group is not particularly limited insofar as it has a functional group capable of forming a polymer, such as an ethylenically unsaturated bond, and a nonionic hydrophilic functional group, and can be selected from known monomers. From the viewpoint of availability, handling properties, and versatility, vinyl monomers are preferable.

Examples of the vinyl monomers include vinyl monomers having a hydrophilic functional group, such as (meth)acrylates, (meth)acryl amides, or vinyl esters having a hydrophilic functional group. Examples of the "hydrophilic functional group" include a hydroxy group, an amino group, an amide group (in which the nitrogen atom is not substituted), and alkylene oxides described later, such as polyethylene oxide or polypropylene oxide.

Specific preferable examples of other hydrophilic structural units include hydroxyethyl(meth)acrylate, hydroxybutyl(meth)acrylate, (meth)acryl amide, aminoethylacrylate, aminopropylacrylate, and (meth)acrylate containing an alkylene oxide polymer. The hydrophilic structural unit having a nonionic hydrophilic group can be formed by polymerization of a corresponding monomer, but the hydrophilic functional group may be introduced into the polymer chain after polymerization.

The hydrophilic structural unit having a nonionic hydrophilic group is more preferably a hydrophilic structural unit having an alkylene oxide structure. From the viewpoint of hydrophilicity, the alkylene moiety in the alkylene oxide structure is preferably an alkylene moiety having 1 to 6 carbon atoms, more preferably an alkylene moiety having 2 to 6 carbon atoms, and particularly preferably an alkylene moiety having 2 to 4 carbon atoms. The degree of polymerization of the alkylene oxide structure is preferably 1 to 120, more preferably 1 to 60, and particularly preferably 1 to 30.

It is also preferable that the hydrophilic structural unit containing a nonionic hydrophilic group is a hydrophilic structural unit containing a hydroxy group. The number of the hydroxy group in the structural unit is not particularly limited, and preferably 1 to 4, more preferably 1 to 3, and particularly preferably 1 to 2 from the viewpoint of the hydrophilicity of the dispersion polymer and the compatibility with the solvent or other monomers during polymerization.

In the above, for example, the content ratio of the hydrophilic structural units depends on the content ratio of the hydrophobic structural unit (a) described later. For example, when the dispersion polymer only contains acrylic acid and/or methacrylic acid [hydrophilic structural unit] and the hydrophobic structural unit (a) described later, the content ratio of the acrylic acid and/or methacrylic acid is calculated by "100–(Mass percentage of hydrophobic structural unit)".

The hydrophilic structural units may be contained singly or as a mixture of two or more thereof.

The content ratio of the hydrophilic structural units in the dispersion polymer is preferably in the range of more than 0% by mass but 15% by mass or less, more preferably in the range of from 2% by mass to 15% by mass, still more preferably in the range of from 5% by mass to 15% by mass, and particularly preferably in the range of from 8% by mass to 12% by mass or less based on the total mass of the dispersion polymer.

<Hydrophobic Structural Unit (a)>

The dispersion polymer in the invention contains at least one hydrophobic structural unit (a) having an aromatic ring linked via a linking group to an atom included in a main chain, a content ratio of the aromatic ring being from 10% by mass to less than 20% by mass based on a total mass of the polymer.

In the structural unit having an aromatic ring linked via a linking group to an atom included in the polymer main chain, since the aromatic ring is not directly bonded to the atom included in the polymer main chain, an adequate distance is kept between the hydrophobic aromatic ring and the hydrophilic structural unit, so that interaction is likely to occur between the dispersion polymer and the pigment, and the dispersion polymer is firmly adsorbed thereto to thereby further improve the dispersibility.

The "hydrophobic structural unit containing an aromatic ring linked via a linking group to an atom included in the main chain" is preferably a structural unit represented by the following Formula (1) in that a pigment can be easily formed into fine particles.

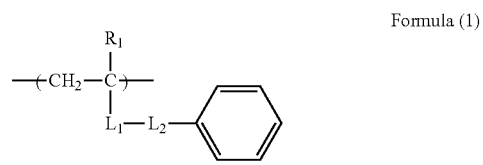

Formula (1)

In Formula (1), $R_1$ represents a hydrogen atom, a methyl group, or a halogen atom (e.g., a chlorine atom, a bromine atom, and an iodine atom).

$L_1$ represents *—COO—, *—OCO—, *—CONR$_2$—, *—O—, or a substituted or unsubstituted phenylene group and $R_2$ represents a hydrogen atom or an alkyl group having 1 to 10 carbon atoms. The symbol * in the group represented by $L_1$ represents a connecting point with the main chain. The substituent when the phenylene group is substituted is not particularly limited, and examples include a halogen atom, an alkyl group, an alkoxy group, a hydroxy group, and a cyano group.

$L_2$ represents a single bond or a divalent linking group having 1 to 30 carbon atoms. When $L_2$ is a divalent linking group, it is preferably a linking group having 1 to 25 carbon atoms, more preferably a linking group having 1 to 20 carbon atoms, and more preferably a linking group having 1 to 15 carbon atoms. Among them, particularly preferable examples include an alkyleneoxy group having 1 to 25 (more preferably 1 to 10) carbon atoms, an imino group (—NH—), a sulfamoyl group, and a divalent linking group containing an alkylene group, such as an alkylene group having 1 to 20 carbon atoms (more preferably 1 to 15 carbon atoms) or an ethylene oxide group [—(CH$_2$CH$_2$O)$_n$—, n=1 to 6], and a group containing a combination of two or more of these groups.

Among the structural units represented by Formula (1), a structural unit in which R$_1$ is a hydrogen atom or a methyl group, L$_1$ is *—COO—, and L$_2$ is a divalent linking group containing an alkylene oxy group and/or an alkylene group and having 1 to 25 carbon atoms is preferable, and a structural unit in which R$_1$ is a hydrogen atom or a methyl group, L$_1$ is *—COO—, and L$_2$ is *—(CH$_2$—CH$_2$—O)$_n$—[n represents the average repetition number, and n=1 to 6] is more preferable.

Among the structural units represented by Formula (1), structural units derived from compounds selected from benzyl methacrylate, phenoxyethylacrylate, and phenoxyethylmethacrylate shown below are preferable from the viewpoint of dispersion stability. The dispersion polymer in the invention preferably contains one or two or more structural units selected from these structural units as a hydrophobic structural unit (a). The invention is not limited to the above.

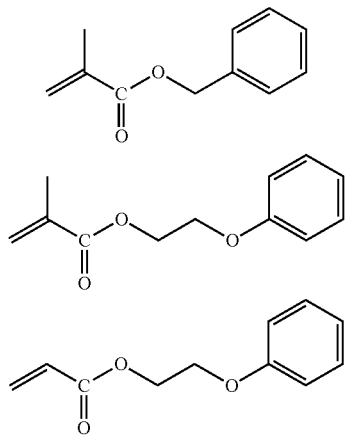

The content ratio of the "hydrophobic structural unit having an aromatic ring linked via a linking group to an atom included in the main chain" in the dispersion polymer is preferably 40% by mass or more based on the total mass of the dispersion polymer from the viewpoint of dispersion stability of a pigment, jetting stability, and cleanability. The content ratio of the hydrophobic structural unit is preferably from 40% by mass to less than 75% by mass, more preferably from 40% by mass to less than 70% by mass, and still more preferably from 40% by mass to less than 60% by mass.

The content ratio of the aromatic ring linked via a linking group to an atom included in the main chain is in the range of from 10% by mass to less than 20% by mass based on the total mass of the polymer, and particularly preferably from 15% by mass to less than 20% by mass. When the content ratio of the aromatic ring is adjusted to the range, abrasion resistance, ink stability, and jetting reliability increase. In other words, when the content ratio of the aromatic ring is less than 10% by mass or 20% by mass or more, the precipitation of the dispersed particles (particularly pigment) after a long period of time is not suppressed, and when an ink composition is prepared, a white deletion defect occurs in images.

In the invention, as preferable examples of the dispersion polymer, from the viewpoint of dispersion stability, a polymer at least having a hydrophilic structural unit having a carboxyl group bonded to an atom included in the main chain and a structural unit (hydrophobic structural unit (a)) derived from (meth)acrylate having an aromatic ring linked via a linking group to an atom included in the main chain is preferable, a polymer at least having a hydrophilic structural unit derived from (meth)acrylic acid and a hydrophobic structural unit (hydrophobic structural unit (a)) derived from one or two or more compounds selected from benzylmethacrylate, phenoxyethylacrylate, and phenoxyethylmethacrylate is more preferable, and a polymer having a hydrophilic structural unit derived from methacrylic acid and a hydrophobic structural unit (hydrophobic structural unit (a)) derived from benzylmethacrylate and/or phenoxyethylmethacrylate is particularly preferable.

The dispersion polymer in the invention preferably has, in addition to the above, a structural unit derived from a C1-4 alkyl ester of (meth)acrylic acid from the viewpoint of dispersion stability. Examples of the (meth)acrylic acid include acrylic acid and methacrylic acid.

Specific examples of the alkyl ester of the (meth)acrylic acid include methyl(meth)acrylate, ethyl(meth)acrylate, (iso)propyl(meth)acrylate, and (iso or tertiary)butyl(meth)acrylate. The number of carbon atoms of the alkyl moiety of the alkyl ester is preferably 1 to 4 and more preferably 1 to 2.

When the dispersion polymer has a structural unit derived from a C1-4 alkyl ester of (meth)acrylic acid, the content ratio of the structural unit in the dispersion polymer is preferably 15% by mass or more based on the total mass of the dispersion polymer in terms of giving dispersion stability. In particular, the content ratio of the structural unit is preferably 20 to 60% by mass and more preferably 20 to 50% by mass.

Examples of a hydrophobic structural unit other than the hydrophobic structural unit (a) which may be used include structural units derived from (meth)acryl amides, styrenes, and vinyl monomers, such as vinyl esters, (meth)acrylates, such as alkyl (number of carbon atoms of 1 to 4) esters of (meth)acrylic acid, etc., which do not belong to the hydrophilic structural units (for example not having a hydrophilic functional group). The structural units can be used singly or as a mixture of two or more thereof.

Examples of the (meth)acrylamides include N-cyclohexyl (meth)acrylamide, N-(2-methoxy ethyl)(meth)acrylamide, N,N-diallyl(meth)acrylamide, and N-allyl(meth)acrylamide. Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, hydroxystyrene protected with a group removable with an acidic substance (e.g., t-Boc), methyl vinyl benzoate, α-methylstyrene, and vinylnaphthalene. Among the above, styrene and α-methylstyrene are preferable. Examples of the vinyl esters include vinyl acetate, vinyl chloroacetate, vinyl propionate, vinyl butylate, vinyl methoxy acetate, and vinyl benzoate. Among the above, vinyl acetate is preferable. Examples of the (meth)acrylates include methyl(meth)acrylate, ethyl(meth)acrylate, (iso)propyl(meth)acrylate, and (iso or tertiary)butyl(meth)acrylate.

The ratio of the hydrophilic structural unit and the hydrophobic structural unit depends on the degree of the hydrophilicity and hydrophobicity thereof, the content ratio (mass ratio) of the hydrophobic structural unit in the dispersion polymer is preferably more than 80% by mass and more preferably more than 85% by mass based on the total mass of the dispersion polymer. In other words, the content ratio (mass ratio) of the hydrophilic structural unit in the dispersion polymer is preferably 15% by mass or less based on the total mass of the dispersion polymer. When the content ratio of the hydrophilic structural unit is 15% by mass or less, the amount of components dissolved alone in a water-based liquid medium without contributing to the dispersion of the pigment decreases, and thus the dispersion state of the pigment can be favorably maintained and an increase in the viscosity is suppressed, whereby jetting properties can be made excellent when formed into an inkjet recording ink.

The dispersion polymer in the invention may be any of a random copolymer in which each structural unit is irregularly introduced or a block copolymer in which each structural unit is regularly introduced. Each structural unit in the case of a block copolymer may be introduced in any order, and the same component may be utilized twice or more. From the viewpoint of versatility and manufacturability, the dispersion polymer is preferably a random copolymer.

The neutralization degree of the dispersion polymer in the invention is 50% to 90%. When the neutralization degree is less than 50% or more than 90%, the precipitation of the dispersed particles (particularly pigments, and, among the pigments, a yellow pigment) after a long period of time is not suppressed and, when an ink composition is prepared, a white deletion defect occurs in images. The neutralization degree of the dispersion polymer is more preferably in the range of 72% to 88%.

The solubility of the dispersion polymer in the invention in water is from 0.2 g to 0.8 g per 5 ml of water (25° C.). When the solubility is less than 0.2 g or more than 0.8 g, the precipitation of the dispersed particles (particularly pigments, and, among the pigments, a yellow pigment) after a long period of time is not suppressed and, when an ink composition is prepared, a white deletion defect occurs in images. The solubility of the dispersion polymer per 5 ml of water is more preferably in the range of 0.3 g to 0.5 g. The solubility of the dispersion polymer per 5 ml of water (25° C.) may also be from 0.2 g to 0.4 g or from 0.3 g to 0.4 g.

The measurement of the solubility is carried out by dispersing the dispersion polymer neutralized to have a desired neutralization degree in 5 ml of water (25° C.) (applying ultrasonic waves for 15 minutes, and stirring for 30 minutes), and measuring a filtrate filtered through a filter by GPC using THF. In this case, the amount of the polymer dissolved in water is determined as the solubility.

The acid value of the dispersion polymer in the invention is preferably from 85 mgKOH/g to 165 mgKOH/g. When the acid value is 85 mgKOH/g or more, the pigment dispersibility and storage stability are excellent. In particular, when the pigment is a resin-coated pigment (encapsulated pigment) in which a pigment is embraced in the dispersion polymer and which is prepared by a phase inversion emulsification method, the improvement effect of the dispersion stability is high and the precipitation after a long period of time is suppressed. The acid value of 165 mgKOH/g or less is advantageous in the storage stability (precipitation suppression of the dispersed particles during storage). In particular, the acid value of the dispersion polymer is more preferably from 85 mgKOH/g to 120 mgKOH/g for the same reason described above.

The acid value is a mass (mg) of KOH required for completely neutralizing 1 g of the dispersion polymer before neutralization, and is measured according to the method described in JIS standard (JIS K0070, 1992).

Among the above, in the dispersion polymer of the invention, the product of the acid value (mgKOH/g) and the neutralization degree (%) is preferably from 5000 to 15000. When the product of the acid value and the neutralization degree is 5000 or more, precipitation over time after dispersing the pigment is suppressed and the dispersion stability is excellent. The product of the acid value and the neutralization degree of 15000 or less is advantageous in the pigment dispersibility (finely dispersing the particles). In particular, the product of the acid value and the neutralization degree is preferably from 5000 to 9500 and more preferably from 6000 to 9000.

The molecular weight of the dispersion polymer is preferably 30000 or more, more preferably 30000 to 150000, still more preferably 30000 to 100000, and particularly preferably 30000 to 80000 in terms of weight average molecular weight (Mw). When the molecular weight is 30000 or more, there is a tendency that the steric repulsion effect as a dispersant becomes excellent and the dispersion polymer becomes likely to be adsorbed to the pigment due to the steric effect. A dispersion polymer having a number average molecular weight (Mn) in the range of about 1000 to 100000 is preferable and a dispersion polymer having a number average molecular weight (Mn) in the range of about 3000 to 50000 is particularly preferable. When the number average molecular weight is within the range above, the function as a coating film on the pigment or the function as an ink coating film can be demonstrated. The dispersion polymer in the invention is preferably used in the form of an alkaline metal or organic amine salt in the aqueous pigment dispersion.

The molecular weight distribution (Weight average molecular weight/Number average molecular weight) of the dispersion polymer is in the range of preferably 1 to 6 and more preferably 1 to 4. When the molecular weight distribution is within the range, the dispersion stability and jetting stability of ink are improved.

The number average molecular weight and the weight average molecular weight are measured by a differential refractometer, THF as a solvent, and a GPC analyzer using columns of TSKgel GMHxL, TSKgel G4000 HxL, and TSKgel G2000 HxL (manufactured by Tosoh Corporation), and are molecular weights determined by conversion using a polystyrene as a reference material.

The dispersion polymer can be synthesized by various polymerization methods, such as solution polymerization, precipitation polymerization, suspension polymerization, precipitation polymerization, bulk polymerization, or emulsion polymerization. The polymerization reaction can be carried out by a known operation, such as a batch, semi-continuous, or continuous operation. Initiation of the polymerization is carried out by a method using a radical initiator or a photoirradiation or radiation-irradiation method. These methods of polymerization and initiation of polymerization are described in, for example, "Kobunshi Gosei Hoho" by Teiji Tsuruta, Revised Edition, published by Nikkan Kogyo Shimbun, Ltd., 1971 and "Kobunshi Gosei no Jikkenho" by Takayuki Ohtsu and Masaetsu Kinoshita, published by Kagaku- Dojin Publishing Company Inc., 1972, pp. 124 to 154. Specifically, the dispersion polymer can be manufactured by performing a copolymerization reaction of a mixture containing a monomer mixture and, as required, an organic solvent and a radical polymerization initiator under an inactive gas atmosphere. Among the polymerization methods, a solution polymerization method using a radical initiator is particularly preferable.

Examples of the solvent to be used in the solution polymerization method include various organic solvents, such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. The solvents may be used singly or in combination of two or more thereof, or may be mixed with water as a mixed solvent. The polymerization temperature needs to be set in relation to the molecular weight of the polymer to be generated and the type of the initiator. The polymerization is usually performed at a temperature in the range of 0° C. to 100° C. and preferably 50° C. to 100° C. The reaction pressure can be appropriately selected, and is usually 1 to 100 kg/cm² and particularly preferably about 1 to about 30 kg/cm². The reaction period is about 5 to 30 hours. The resultant resin may be subjected to purification treatment, such as re-precipitation.

Specific preferable examples of dispersion polymers in the invention are shown below. The invention is not limited to these examples.

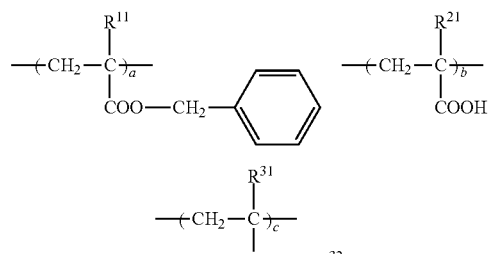

(a, b, and c each represent the content ratio of the unit (% by mass).)

| | $R^{11}$ | $R^{21}$ | $R^{31}$ | $R^{32}$ | a | b | c | Mw |
|---|---|---|---|---|---|---|---|---|
| B-1 | $CH_3$ | $CH_3$ | $CH_3$ | —$CH_3$ | 60 | 10 | 30 | 46000 |
| B-2 | H | H | H | —$CH_3$ | 60 | 10 | 30 | 50000 |
| B-3 | $CH_3$ | $CH_3$ | $CH_3$ | —$CH_2CH_3$ | 61 | 10 | 29 | 43000 |
| B-4 | $CH_3$ | $CH_3$ | $CH_3$ | —$CH_2CH_2CH_2CH_3$ | 61 | 9 | 30 | 51000 |
| B-5 | $CH_3$ | $CH_3$ | $CH_3$ | —$CH(CH_3)_2$ | 60 | 9 | 31 | 96000 |
| B-6 | H | H | H | —$C(CH_3)_3$ | 60 | 10 | 30 | 32000 |
| B-7 | $CH_3$ | $CH_3$ | $CH_3$ | —$CH_2CH(CH_3)_2$ | 70 | 5 | 25 | 75000 |

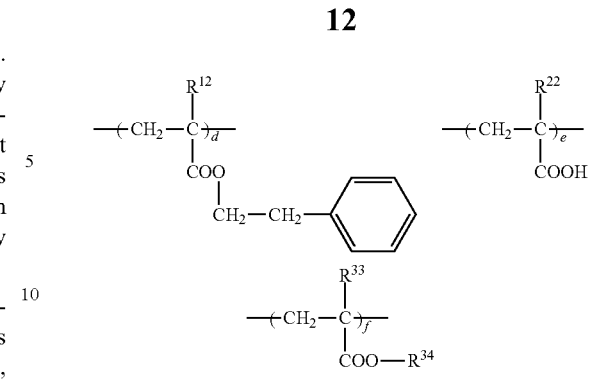

(d, e, and f each represent the content ratio of the unit (% by mass).)

| | $R^{12}$ | $R^{22}$ | $R^{33}$ | $R^{34}$ | d | e | f | Mw |
|---|---|---|---|---|---|---|---|---|
| B-8 | $CH_3$ | $CH_3$ | $CH_3$ | —$CH_3$ | 55 | 12 | 33 | 31000 |
| B-9 | H | H | H | —$CH_2CH(CH_3)_2$ | 70 | 10 | 20 | 34600 |

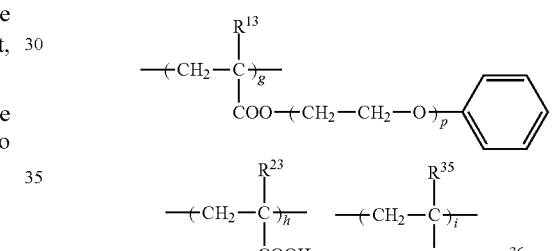

(g, h, and i each represent the content ratio of the unit (% by mass).)

| | $R^{13}$ | p | $R^{23}$ | $R^{35}$ | $R^{36}$ | g | h | i | Mw |
|---|---|---|---|---|---|---|---|---|---|
| B-10 | $CH_3$ | 1 | $CH_3$ | $CH_3$ | —$CH_3$ | 60 | 9 | 31 | 35500 |
| B-11 | H | 1 | H | H | —$CH_2CH_3$ | 69 | 10 | 21 | 41200 |
| B-12 | $CH_3$ | 2 | $CH_3$ | $CH_3$ | —$CH_3$ | 70 | 11 | 19 | 68000 |
| B-13 | $CH_3$ | 4 | $CH_3$ | $CH_3$ | —$CH(CH_3)_2$ | 70 | 7 | 23 | 72000 |
| B-14 | H | 5 | H | H | —$CH_3$ | 70 | 10 | 20 | 86000 |
| B-15 | H | 5 | H | H | —$CH_2CH(CH_3)_2$ | 70 | 2 | 28 | 42000 |

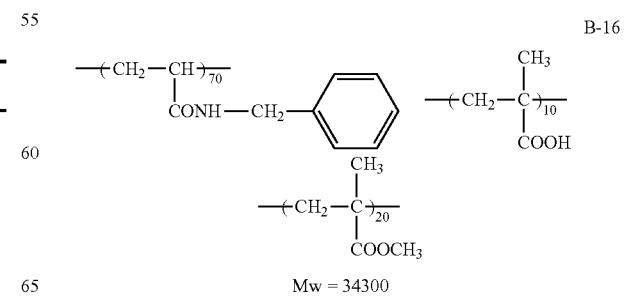

Mw = 34300

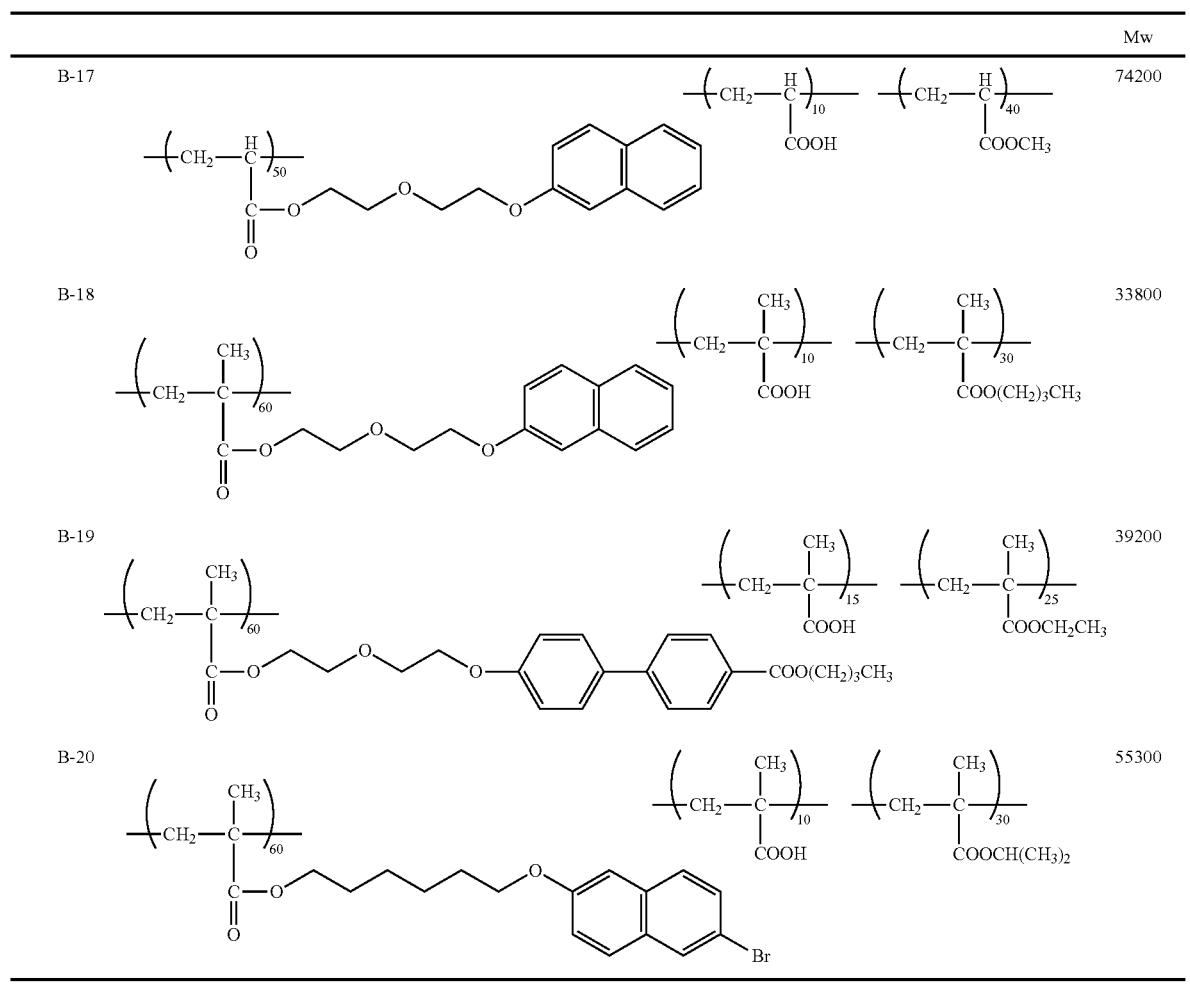

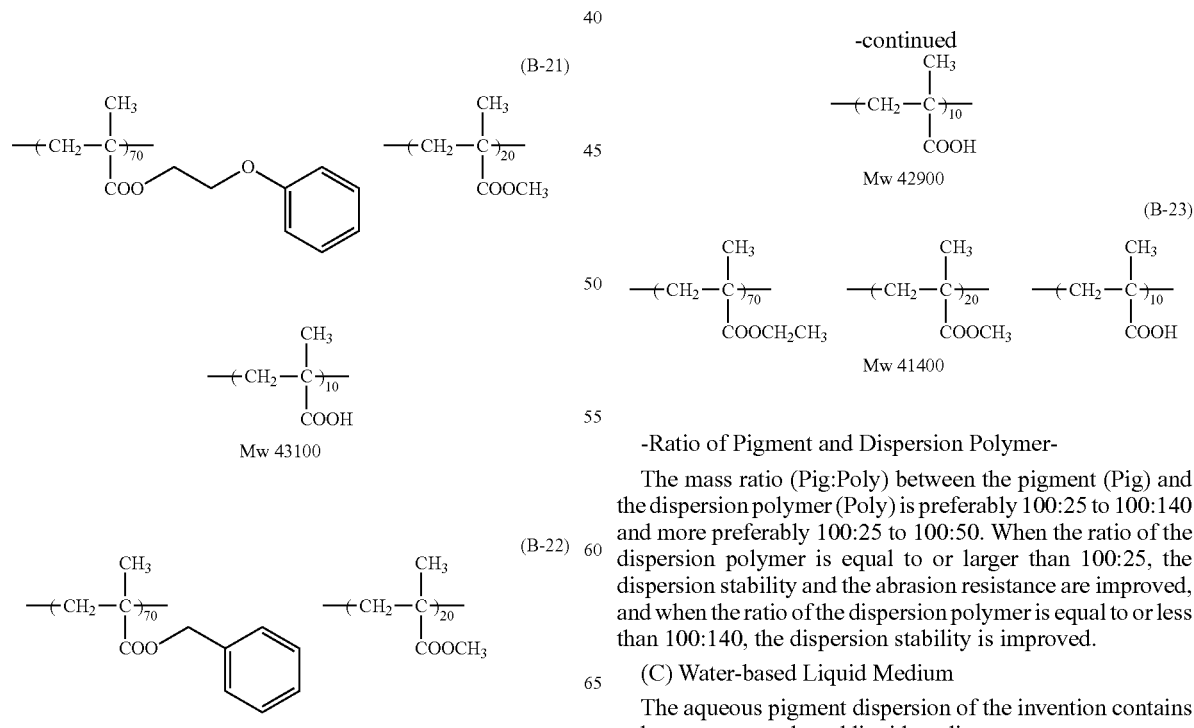

-Ratio of Pigment and Dispersion Polymer-

The mass ratio (Pig:Poly) between the pigment (Pig) and the dispersion polymer (Poly) is preferably 100:25 to 100:140 and more preferably 100:25 to 100:50. When the ratio of the dispersion polymer is equal to or larger than 100:25, the dispersion stability and the abrasion resistance are improved, and when the ratio of the dispersion polymer is equal to or less than 100:140, the dispersion stability is improved.

(C) Water-based Liquid Medium

The aqueous pigment dispersion of the invention contains at least one water-based liquid medium.

Examples of the water-based liquid medium include water and water-soluble organic solvents. Examples of the water-soluble organic solvents include alkane diols (polyhydric alcohols), such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; sugars, such as glucose, mannose, or fructose; sugar alcohols; hyaluronic acids; alkyl alcohols having 1 to 4 carbon atoms, such as ethanol, methanol, butanol, propanol, or isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, tripropylene glycol monomethyl ether, dipropylene glycol mono-n-propyl ether, or dipropylene glycol mono-iso-propyl ether; 2-pyrrolidone, and N-methyl-2-pyrrolidone. These organic solvents can be used singly or in combination of two or more thereof.

For preventing drying or for moisturizing, polyhydric alcohols are useful. Examples of the polyhydric alcohols include glycerin, ethylene glycol, diethylene glycol, triethylene glycol, propylene glycol, dipropylene glycol, tripropylene glycol, 1,3-butanediol, and 2,3-butanediol. These polyhydric alcohols may be used singly or in combination of two or more thereof.

For accelerating penetration, polyol compounds are preferable and aliphatic diols are suitable. Examples of the aliphatic diols include 2-ethyl-2-methyl-1,3-propanediol, 3,3-dimethyl-1,2-butanediol, 2,2-diethyl-1,3-propanediol, 2-ethyl-1,3-hexanediol, and 2,2,4-trimethyl-1,3-pentanediol. Among the above, preferable examples include 2-ethyl-1,3-hexanediol and 2,2,4-trimethyl-1,3-pentanediol.

The aqueous pigment dispersion of the invention is not particularly limited in the amount of water. The content of water is preferably 10 to 99% by mass, more preferably 30 to 80% by mass, and still more preferably 50 to 70% by mass.

<Ink Composition>

The ink composition of the invention is constituted using the aqueous pigment dispersion of the invention previously described above. Specifically, the ink composition of the invention contains (A) a pigment, (B) a dispersion polymer having a neutralization degree of from 50% to 90% and a solubility of from 0.2 g to 0.8 g per 5 ml of water (25° C.), and containing an acidic group and a hydrophobic structural unit (a) having an aromatic ring linked via a linking group to an atom included in a main chain, a content ratio of the aromatic ring being from 10% by mass to less than 20% by mass based on a total mass of the polymer, and (C) a water-based liquid medium, and preferably further contains resin particles, a surfactant, and a water-soluble organic solvent. When resin particles are contained, the abrasion resistance is improved, and when a surfactant is contained, the surface tension can be adjusted. The ink composition may further contain other components, such as a UV absorber or a fading inhibitor, as required.

In the invention, as described in the section of the aqueous pigment dispersion previously described above, a favorable dispersion state is obtained after the dispersion of the pigment, and the storage stability over a long period of time is excellent, and thus the occurrence of a white deletion defect is suppressed in the ink composition to be obtained and excellent images can be formed.

(Water-soluble Organic Solvent)

The ink composition of the invention preferably contains at least one water-soluble organic solvent. The water-soluble organic solvent can provide the effect of preventing drying, moisturizing, or accelerating penetration. For preventing drying, the water-soluble organic solvent is used as an anti-drying agent for preventing clogging at an ink jetting port of a jetting nozzle caused by adhesion, drying, and aggregation of ink, and for preventing drying and for moisturizing, a water-soluble organic solvent having a vapor pressure lower than that of water is preferable. The water-soluble organic solvent can be used for accelerating penetration as a penetration accelerator that improves the ink penetration properties in paper.

Examples of the water-soluble organic solvent include the same solvents mentioned as the water-soluble organic solvent that can be blended in the aqueous pigment dispersion. In the ink composition of the invention, water-soluble organic solvents having an SP value of 27.5 or less are preferably contained. When water-soluble organic solvents having an SP value of 27.5 or less are used, occurrence of curling under various environmental moisture conditions after recording can be further suppressed. The fixability of images is also improved. In particular, the water-soluble organic solvent having an SP value of 27.5 or less preferably constitutes 70% by mass or more of the water-soluble organic solvents. By increasing the amount of solvents having a relatively low SP value, the abrasion resistance of images can be improved. The SP value (solubility parameter) refers to a value indicated by the square root of the molecule cohesive energy, and calculated by the method described in R. F. Fedors, Polymer Engineering Science, 14, p. 147-154 (1974).

The solvents can be used for preventing drying or for moisturizing in order to prevent clogging at a nozzle opening of a head caused by drying of the inkjet ink composition, and a water-soluble organic solvent having a vapor pressure lower than that of water is preferable for preventing drying or for moisturizing. For better penetration of the ink composition in paper, the water-soluble organic solvents are preferably used for accelerating penetration.

Examples of the water-soluble organic solvent having an SP value of 27.5 or less include:

Diethylene glycol monoethyl ether (SP value: 22.4)

Diethylene glycol monobutyl ether (SP value: 21.5)

Triethylene glycol monomethyl ether (SP value: 22.1)

Triethylene glycol monoethyl ether (SP value: 21.7)

Triethylene glycol monobutyl ether (SP value: 21.1)

Dipropylene glycol monomethyl ether (SP value: 21.3)

Dipropylene glycol (SP value: 27.2)

Tripropylene glycol monomethyl ether (20.4), and an alkylene oxide adduct of glycerin represented by the following Formula (1).

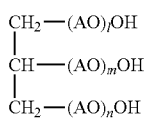
Structural Formula (1)

In Structural Formula (1), 1, m, and n each independently represent an integer of 1 or more and satisfies 1+m+n=3 to 15. When the value of 1+m+n is 3 or more, the curl inhibition effect is excellent and when the value of 1+m+n is 15 or less, favorable jetting properties can be maintained. In particular, the value of 1+m+n is in the range of preferably 3 to 12 and more preferably 3 to 10. AO in Structural Formula (1) represents ethyleneoxy (sometimes abbreviated as EO) and/or propyleneoxy (sometimes abbreviated as PO) and, in particular, a propylene oxy group is preferable. Each AO in $(AO)_l$, $(AO)_m$, and $(AO)_n$ may be the same or different.

Examples of the compounds represented by Formula (1) are shown below. The value in the brackets is the SP value. The invention is not limited to the examples.

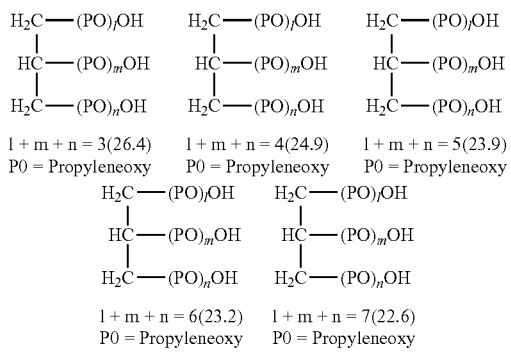

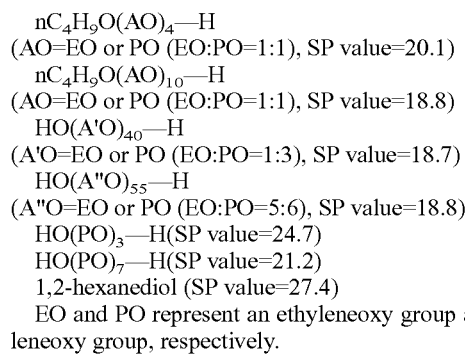

$nC_4H_9O(AO)_4$—H
(AO=EO or PO (EO:PO=1:1), SP value=20.1)
$nC_4H_9O(AO)_{10}$—H
(AO=EO or PO (EO:PO=1:1), SP value=18.8)
$HO(A'O)_{40}$—H
(A'O=EO or PO (EO:PO=1:3), SP value=18.7)
$HO(A''O)_{55}$—H
(A''O=EO or PO (EO:PO=5:6), SP value=18.8)
$HO(PO)_3$—H(SP value=24.7)
$HO(PO)_7$—H(SP value=21.2)
1,2-hexanediol (SP value=27.4)

EO and PO represent an ethyleneoxy group and a propyleneoxy group, respectively.

The alkylene oxide adduct of glycerin may be a commercially-available product. Examples include, as polyoxypropylated glycerin (ether of polypropylene glycol and glycerin), SANNIX GP-250 (trade name, average molecular weight of 250), SANNIX GP-400 (trade name, average molecular weight of 400), and SANNIX GP-600 (trade name, average molecular weight of 600) [manufactured by Sanyo Chemical Industries, Ltd.]; LEOCON GP-250 (trade name, average molecular weight of 250), LEOCON GP-300 (trade name, average molecular weight of 300), LEOCON GP-400 (trade name, average molecular weight of 400), and LEOCON GP-700 (trade name, average molecular weight of 700) [manufactured by Lion Corporation]; and polypropylene triol glycol triol type (average molecular weight of 300, average molecular weight of 700) [manufactured by Wako Pure Chemical Industries, Ltd.].

The water-soluble organic solvents can be used singly or as a mixture of two or more thereof.

The content of the water-soluble organic solvent in the ink composition is preferably less than 20% by mass based on the total mass of the composition. The content of the water-soluble organic solvent of less than 20% by mass is advantageous for drying, fixing, and the like in a short time after recording when a recording speed is further increased by recording with a single path, for example. In particular, the content of the water-soluble organic solvent is preferably from 5% by mass to less than 20% by mass and particularly preferably from 7% by mass to 17% by mass based on the total mass of the composition.

(Resin Particles)

Examples of resin particles include fine particles of acrylic resin, vinyl acetate resin, styrene-butadiene resin, vinyl chloride resin, acryl styrene resin, butadiene resin, styrene resin, crosslinked acrylic resin, crosslinked styrene resin, benzoguanamine resin, phenol resin, silicone resin, epoxy resin, urethane resin, paraffin resin, fluorine resin, and the like or polymer latexes containing these resins.

Preferable examples include acrylic resin, acryl styrene resin, styrene resin, crosslinked acrylic resin, and crosslinked styrene resin.

The weight average molecular weight of the resin particles is preferably from 10000 to 200000 and more preferably from 100000 to 200000. The average particle diameter of the resin particles is in the range of preferably 10 nm to 1 μm, more preferably 10 nm to 200 nm, still more preferably 20 nm to 100 nm, and particularly preferably 20 nm to 50 nm. The particle diameter distribution of the resin particles is not particularly limited and may be any of one having a large particle diameter distribution or one having a monodisperse particle diameter distribution. Two or more kinds of polymer particles having a monodisperse particle diameter distribution may be mixed for use.

The content of the resin particles in the ink composition is preferably 0.5 to 20% by mass, more preferably 3 to 20% by mass, and still more preferably 5 to 15% by mass based on the total mass of the ink composition.

The glass transition temperature (Tg) of the resin particles is preferably 30° C. or higher, more preferably 40° C. or higher, and still more preferably 50° C. or higher.

(Surfactant)

A surfactant is used as a surface tension regulator. Examples of the surfactant include nonionic, cationic, anionic, and betaine surfactants. The surfactant is preferably contained in an amount such that the ink composition has a surface tension of 20 to 60 mN/m. When the surfactant is contained in the range above, the ink composition can be favorably jetted by an inkjet method. In particular, the surfactant is preferably contained in an amount such that the surface tension can be adjusted to 20 to 45 mN/m and more preferably 25 to 40 mN/m.

As the surfactant, compounds containing hydrophilic and hydrophobic moieties in the molecules thereof and the like are preferable. Any of anionic surfactants, cationic surfactants, amphoteric surfactants, or nonionic surfactants can be used. Specific examples of the anionic surfactants include sodium dodecylbenzene sulfonate, sodium lauryl sulfate, sodium alkyl diphenyl ether disulfonate, sodium alkyl naphthalene sulfonate, sodium dialkyl sulfosuccinate, sodium stearate, potassium oleate, sodium dioctyl sulfosuccinate, sodium polyoxyethylene alkyl ether sulfate, sodium polyoxyethylene alkyl ether sulfate, sodium polyoxyethylene alkyl phenyl ether sulfate, sodium dialkyl sulfosuccinate, sodium stearate, sodium oleate, and sodium t-octylphenoxy ethoxypolyethoxyethyl sulfate. Specific examples of the nonionic surfactants include polyoxyethylenelauryl ether, polyoxyethyleneoctylphenyl ether, polyoxyethyleneoleylphenyl ether, polyoxyethylenenonylphenyl ether, an oxyethylene-oxypropylene block copolymer, t-octylphenoxyethylpolyethoxyethanol, and nonylphenoxyethyl polyethoxyethanol. Specific examples of the cationic surfactants include tetraalkyl ammonium salts, alkylamine salts, benzalkonium salts, alkylpyridium salts, and imidazolium salts. Specific examples thereof include dihydroxyethylstearylamine, 2-heptadecenyl-hydroxyethylimidazoline, lauryldimethylbenzylammonium chloride, cetylpyridinium chloride, and stearamidomethylpyridinium chloride.

The content of the surfactant in the ink composition is not particularly limited, and is preferably 1% by mass or more, more preferably 1 to 10% by mass, and still more preferably 1 to 3% by mass.

(Other Components)

The ink composition may contain, in addition to the components described above, various additives as other components, as required. Examples of the additives include known additives, such as an UV absorber, a fading inhibitor, an anti-mildew agent, a pH adjuster, a rust preventive agent, an antioxidant, an emulsion stabilizer, an antiseptic agent, an antifoaming agent, a viscosity regulator, a dispersion stabilizer, and a chelate agent.

-Physical Properties of Ink-

The surface tension (25° C.) of the ink composition is preferably from 20 mN/m to 60 mN/m, more preferably from 20 mN/m to 45 mN/m, and still more preferably from 25 mN/m to 40 mN/m. The surface tension is measured at 25° C. using Automatic Surface Tensiometer CBVP-Z (trade name, manufactured by Kyowa Interface Science Co., Ltd.). The ink composition preferably has a viscosity at 25° C. of from 1.2 mPa·s to 15.0 mPa·s, more preferably from 2 mPa·s to less than 13 mPa·s, and still more preferably from 2.5 mPa·s to less than 10 mPa·s. The viscosity is measured at 25° C. using VISCOMETER TV-22 (trade name, manufactured by Toki Sangyo Co., Ltd.).

The ink composition of the invention is used as an inkjet ink and can be used for the formation of color images. For the formation of full color images, the ink composition of the invention is preferably used as a magenta color tone ink, a cyan color tone ink, and a yellow color tone ink, and may be used as a black color tone ink in order to adjust the color tone. Moreover, the ink composition of the invention can be used as, in addition to the yellow color tone ink, magenta color tone ink, and cyan color tone ink, a red ink, a green ink, a blue ink, a white ink, a so-called special ink in the printing field.

<Image Forming Method>

An image forming method of the invention at least has an ink applying process for applying the ink composition of the invention previously described above onto a recording medium by an inkjet method and a treatment liquid applying process for applying a treatment liquid containing an acidic compound that aggregates components in the ink composition onto the recording medium. The image forming method of the invention can include other processes, such as a fixing process, as required. By forming images using the ink composition of the invention previously described above, images having no white deletion defect and having excellent abrasion resistance are obtained.

-Ink Applying Process-

In the ink applying process, the ink composition of the invention previously described above is applied to a recording medium by, for example, jetting by an inkjet method or the like, to form images on the recording medium. Examples of the inkjet method include any method including jetting an ink composition for inkjet recording in the form of liquid droplets from a nozzle, and adhering the liquid droplets to a recording medium.

In the image formation by the inkjet method, the ink composition is jetted onto a recording medium by applying energy to form colored images. Examples of the inkjet recording method preferable for the invention include the method described in JP-A No. 2003-306623, paragraphs 0093 to 0105.

The inkjet method is not particularly limited, and may be any system, such as a charge controlling system of jetting an ink using electrostatic attraction, a drop on demand system (pressure pulse system) utilizing vibration pressure of piezo elements, an acoustic inkjet system of converting an electric signal to acoustic beam, and irradiating an ink with the acoustic beam to jet the ink utilizing the radiation pressure, and a thermal inkjet system utilizing a pressure generated by bubbles formed in an ink by heating. The inkjet method described in JP-A No. 54-59936 can be effectively utilized in which heat energy is applied to an ink to thereby sharply change the volume, and the ink is made to be jetted from a nozzle by the force exerted by the change in the state.

Examples of the inkjet method include a system of jetting a large number of droplets of a low concentration ink, which is referred to as a photo ink, at a small volume, a system of improving the image quality using a plurality of inks having substantially the same color and different concentrations, and a system using a colorless and transparent ink.

In the image forming method of the invention, an embodiment in which the ink compositions of the respective colors are each charged and stored in a relatively high-capacity container (e.g.: tank) having a sum of a length, a width, and a height of 40 cm or more (preferably a sum of a length, a width, and a height of 60 cm or more), and the ink compositions stored therein are applied is preferable. More specifically, the ink composition of the invention is obtained by dispersing similarly to the aqueous pigment dispersion previously described above and has stable dispersibility in which precipitation is hard to occur after a long period of time. Therefore, the ink composition of the invention can be used without shaking over a long period of time and can be preferably used with an ink tank that cannot improve ink uniformity by shaking.

The recording medium is not particularly limited, and examples include a regular paper, a high-quality paper, and a coated paper. The coated paper refers to one having a coat layer by applying a coating material to the surface of a high-quality paper, a neutral paper, or the like which contains cellulose as the main component and is not generally surface-treated. In general, in the image formation by usual water-based inkjet using a coated paper as a recording medium, quality problems of image bleeding, abrasion resistance and the like are likely to occur. However, in the image forming method of the invention, images having suppressed image bleeding, uniformity, suppressed generation of density unevenness, and excellent abrasion resistance are obtained.

As the coated paper, a generally marketed coated paper can be obtained and used. For example, a coated paper for general printing can be used and specific examples include coated paper (A2, B2), such as "OK TOPCOAT+" (trade name) manufactured by Oji Paper or "AURORA COAT" or "U-LIGHT" (trade name) manufactured by Nippon Paper Industries Co., Ltd., or art paper (A1), such as "TOKUBISHI ART" (trade name) manufactured by Mitsubishi Paper Mills, Ltd.

-Treatment Liquid Applying Process-

In the treatment liquid applying process, a treatment liquid containing an acidic compound that aggregates components in the ink composition applied in the ink applying process onto a recording medium. By bringing the treatment liquid into contact with the ink composition to thereby aggregate components in the ink composition, image formation can be performed at a high speed.

As a method for applying the treatment liquid onto a recording medium, any of a method for imagewise applying the treatment liquid and a method for applying the treatment liquid on the whole surface may be acceptable and known liquid applying methods can be used without limitation. Examples include an applying method using an inkjet system and an applying method using a coating roller.

The applied amount of the treatment liquid is not particularly limited insofar as the ink composition can be aggregated and can be suitably selected according to an applying method. For example, in the case of the treatment liquid containing an acidic compound, the applied amount of the acidic compound is preferably 0.3 g/m$^2$ or more, more preferably 0.3 g/m$^2$ to 2 g/m$^2$, and still more preferably 0.5 g/m$^2$ to 1 g/m$^2$.

Examples of the treatment liquid containing the acidic compound include a liquid capable of producing an aggregate by changing the pH of the ink composition. In this case, the pH (25° C.) of the treatment liquid is preferably 3.5 or less, more preferably 0.5 to 2.5, and still more preferably 0.5 to 1.5 from the viewpoint of the aggregation speed of the ink composition. In this case, the pH (25° C.) of the ink composition to be used in the ink applying process is preferably 7.5 or more (preferably 8 or more).

In particular, it is preferable in the invention that the pH (25° C.) of the ink composition is 8 or more and the pH (25° C.) of the treatment liquid is 3.5 or less (preferably 0.5 to 2.5) from the viewpoint of the image density, resolution, and an increase in the image formation speed.

The aggregation component can be used singly or as a mixture of two or more thereof.

Examples of the acidic compound include compounds having a phosphoric acid group, a phosphonic acid group, a phosphinic acid group, a sulfuric acid group, a sulfonic acid group, a sulfinic acid group, or a carboxyl group, or a salt thereof. In particular, compounds having a phosphoric acid group or a carboxyl group are more preferable and compounds having a carboxyl group are still more preferable from the viewpoint of the aggregation speed of the ink composition.

The compounds having a carboxyl group are preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrolecarboxylic acid, furancarboxylic acid, pyridinecarboxylic acid, coumaric acid, thiophenecarboxylic acid, nicotinic acid, derivatives of these compounds, or salts of these compounds. These compounds may be used singly or in combination of two or more thereof.

The treatment liquid can further contain, in addition to the acidic compound, an aqueous solvent (e.g., water). The content of the acidic compound in the treatment liquid is preferably 5 to 95% by mass and more preferably 10 to 80% by mass based on the total mass of the treatment liquid from the viewpoint of the aggregation effect.

The treatment liquid may contain other additives insofar as the effect of the invention is not impaired. Examples of other additives include known additives, such as a drying inhibitor (moistener), a fading inhibitor, an emulsion stabilizer, a penetration accelerator, a UV absorber, an antiseptic agent, an anti-mildew agent, a pH adjuster, a surface tension adjuster, an antifoaming agent, a viscosity regulator, a dispersant, a dispersion stabilizer, a rust preventive agent, or a chelate agent, and substances mentioned as specific examples of other additives contained in the water-based ink for inkjet recording can be applied.

The viscosity of the treatment liquid is preferably in the range of 1 to 30 mPa·s, more preferably in the range of 1 to 20 mPa·s, still more preferably in the range of 2 to 15 mPa·s, and particularly preferably 2 to 10 mPa·s from the viewpoint of the aggregation speed of the ink composition. The viscosity is measured at 20° C. using VISCOMETER TV-22 (trade name, manufactured by TOKI SANGYO CO.LTD).

The surface tension of the treatment liquid is preferably 20 mN/m to 60 mN/m, more preferably 20 mN/m to 45 mN/m, and still more preferably 25 mN/m to 40 mN/m from the viewpoint of the aggregation speed of the ink composition. The surface tension is measured at 25° C. using Automatic Surface Tensiometer CBVP-Z (trade name, manufactured by Kyowa Interface Science Co., Ltd.).

In the invention, an embodiment in which the ink applying process is carried out after applying the treatment liquid in the treatment liquid applying process is preferable. More specifically, an embodiment is preferable in which, before applying the ink composition, a treatment liquid for aggregating components in the ink composition (particularly dispersed particles contained in the ink composition, such as pigments or polymer particles) is applied onto a recording medium beforehand, and then the ink composition is applied to contact the treatment liquid applied onto the recording medium to form images. Thus, inkjet recording can be performed at a higher speed and images having high density and resolution are obtained even when the recording speed is increased.

Recorded matter formed using the ink composition of the invention has excellent image quality and excellent abrasion resistance.

According to the invention, for example, the following embodiments <1> to <11> may be provided.

<1> An aqueous pigment dispersion comprising:
(A) a pigment;
(B) a dispersion polymer having a neutralization degree of from 50% to 90% and a solubility of from 0.2 g to 0.8 g per 5 ml of water (25° C.), and containing an acidic group and a hydrophobic structural unit (a) having an aromatic ring linked via a linking group to an atom included in a main chain, a content ratio of the aromatic ring being from 10% by mass to less than 20% by mass based on a total mass of the polymer; and
(C) a water-based liquid medium.

<2> The aqueous pigment dispersion according to <1>, wherein the hydrophobic structural unit (a) contains a structural unit represented by the following Formula (1):

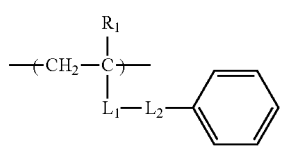

Formula (1)

wherein $R_1$ represents a hydrogen atom, a methyl group, or a halogen atom; $L_1$ represents *—COO—, *—OCO—, *—CONR_2—, *—O—, or a substituted or unsubstituted phenylene group; $R_2$ represents a hydrogen atom or an alkyl group having 1 to 10 carbon atoms; $L_2$ represents a single bond or a divalent linking group having 1 to 30 carbon atoms; and the symbol * in the group represented by $L_1$ represents a connecting point with the main chain.

<3> The aqueous pigment dispersion according to <1> or <2>, wherein an acid value of the dispersion polymer (B) is from 85 mgKOH/g to 165 mgKOH/g.

<4> The aqueous pigment dispersion according to any one of <1> to <3>, wherein the dispersion polymer (B) has a product of an acid value (mgKOH/g) and the neutralization degree (%) of from 5,000 to 15,000.

<5> The aqueous pigment dispersion according to any one of <1> to <4>, wherein a weight average molecular weight of the dispersion polymer (B) is 30,000 or more.

<6> The aqueous pigment dispersion according to any one of <1> to <5>, wherein the pigment (A) is an azo yellow pigment.

<7> An ink composition comprising the aqueous pigment dispersion according to any one of <1> to <6>. The ink composition of the invention is suitable as an ink for inkjet recording.

<8> The ink composition according to <7>, further comprising a water-soluble organic solvent having an SP value of 27.5 or less.

<9> An image forming method comprising:
applying the ink composition according to <7> or <8> onto a recording medium by an inkjet method;
applying a treatment liquid containing an acidic compound that aggregates components in the ink composition onto the recording medium; and
contacting the ink composition with the treatment liquid to form an image.

<10> The image forming method according to <9>, wherein the ink composition, charged in a container having a sum of a length, a width, and a height of 40 cm or more, is applied onto the recording medium.

<11> The image forming method according to <9> or <10>, wherein the ink composition is applied onto the recording medium after the treatment liquid is applied onto the recording medium, thereby forming the image.

Accordingly, the invention can provide an aqueous pigment dispersion in which the precipitation of dispersed particles is suppressed and the dispersion stability for a long period of time is excellent and which can suppress the occurrence of a white deletion defect in images when an ink composition is prepared. The invention can also provide an ink composition and an image forming method that can suppress the occurrence of a white deletion defect and form favorable images.

EXAMPLES

Hereinafter, the invention will be more specifically described with reference to the following Examples but is not limited thereto. Unless otherwise specified, "part" is based on mass.

The weight average molecular weight was measured by gel permeation chromatography (GPC). The GPC was carried out using HLC-8020 GPC (trade name, manufactured by Tosoh Corporation), three columns of TSKgel, SUPER Multipore HZ-H (trade name, manufactured by Tosoh Corporation, 4.6 mm ID×15 cm), and THF (tetrahydrofuran) as an eluate. The measurement was performed under the conditions of a sample concentration of 0.45% by mass, a flow rate of 0.35 ml/min, a sample injection amount of 10 μl, and a measurement temperature of 40° C., and an RI detector was used. The calibration curve was produced using eight samples of "Standard sample TSK standard, polystyrene": "F-40", "F-20", "F-4", "F-1", "A-5000", "A-2500", "A-1000", and "n-propyl benzene" manufactured by Tosoh Corporation.

[Synthesis of Resin Dispersant]

(Synthesis Example 1)

Synthesis of Dispersion Polymer B-1

According to the following scheme, a dispersion polymer B-1 (resin dispersant) was synthesized as follows.

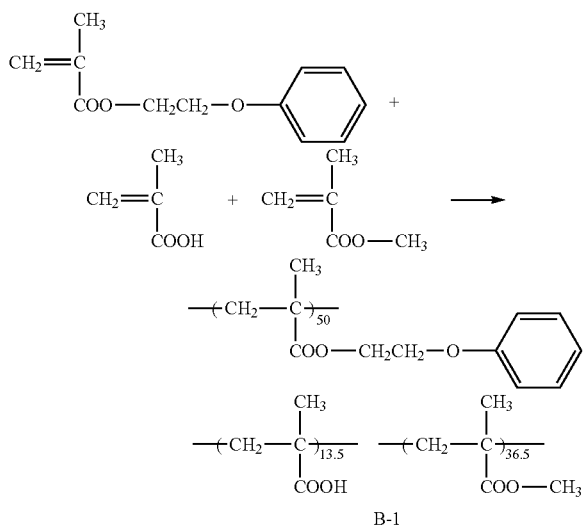

33 g of methyl ethyl ketone was placed in a 500 ml three-necked flask equipped with a stirrer and a cooling tube, and heated to 72° C. under a nitrogen atmosphere. Into the flask, a solution prepared by dissolving 2 g of dimethyl-2,2'-azobisisobutylate, 50 g of phenoxyethyl methacrylate, 13.5 g of methacrylic acid, and 36.5 g of methyl methacrylate in 70 g of methyl ethyl ketone was added dropwise over 3 hours. After the completion of the dropwise addition, the reaction was carried out for further one hour, and then a solution prepared by dissolving 0.2 g of dimethyl-2,2'-azobisisobutylate in 2 g of methyl ethyl ketone was added in the flask, and the solution was heated to 78° C. and heated for 4 hours. The obtained reaction solution was re-precipitated twice in excess amounts of hexane, and the precipitated polymer was dried to obtain 95 g of dispersion polymer B-1.

The composition of the obtained polymer was confirmed by $^1$H-NMR and the weight average molecular weight (Mw) was 40300 as determined by GPC. The acid value of the polymer was 88.0 mgKOH/g as determined by the method described in JIS Standard (JIS K 0070:1992).

(Synthesis Example 2)

Synthesis of Dispersion Polymers B-2 to B-34

Dispersion polymers (resin dispersants) B-2 to B-34 were obtained in the same manner as in Synthesis Example 1, except that the monomer to be used for the synthesis in the Synthesis Example 1 was changed as shown in Table 1 in accordance with each polymer.

The molecular weight was adjusted by adjusting the added amount of the dimethyl-2,2'-azobisisobutylate as an initiator, and the acid value was adjusted by adjusting the monomer feed ratio.

-Measurement of Solubility-

The solubility of the resin dispersant synthesized above was measured by the following method.

0.5 g of each dispersion polymer (resin dispersant) was neutralized using an aqueous 1N NaOH solution (the addition amount of which was determined based on the intended neutralization degree of the dispersion polymer, the acid value of the dispersion polymer, and the weight of the dispersion polymer) so as to have a desired neutralization degree (40%, 50%, 60%, 70%, 80%, or 100%). The obtained partially or completely neutralized dispersion polymer was dispersed in 5 mL of water (25° C.) (by applying ultrasonic waves for 15 minutes and stirring for 30 minutes), and then filtered through a 0.2 µm filter. The filtrate was measured by GPC using THF and quantified. In this case, the amount of the polymer dissolved in water was defined as a solubility. The measurement value of the solubility is shown in Table 1.

[Preparation of Water-based Ink for Inkjet Recording]

(1) Preparation of Sample 2

-Preparation of Dispersion of Resin-Coated Pigment Particles (Pigment dispersion (P-2))-

10 parts of Pigment Yellow 74 (PY74; (trade name) Irgalite Yellow GS, manufactured by Ciba Specialty Chemicals), 5 parts of the dispersion polymer B-2 obtained above, 42 parts of methyl ethyl ketone, 6.2 parts of aqueous 1 N NaOH solution, and 87.2 parts of ion exchanged water were mixed with a disper mixer, and the mixture was subjected to 8-pass treatment with a dispersing device (Microfluidizer M-140K, 150 MPa, trade name, manufactured by MIZUHO INDUSTRIAL CO., LTD.). By removing the methyl ethyl ketone and also removing some water from the obtained dispersion under a reduced pressure at 55° C., a dispersion of pigment-containing resin particles having a pigment concentration of 10.2% by mass was obtained. Further, the dispersion was centrifuged at 5000 rpm for 30 minutes with a centrifuge (05P-21, trade name, manufactured by Hitachi), and then ion exchanged water was added so that the pigment concentration was 15% by mass. Thus, the pigment dispersion liquid was adjusted to obtain a pigment dispersion (P-2).

-Preparation of Water-based Ink-

A pigment dispersion-containing composition having the following ink composition was prepared using the pigment dispersion (P-2) obtained above. Then, the composition was centrifuged (for 30 minutes to 2 hours at 10000 to 20000 rpm) to thereby obtain a water-based ink (sample 2).

<Ink Composition>

| | |
|---|---|
| Pigment dispersion (P-2) above | 40 parts |
| Glycerin | 7 parts |
| Diethylene glycol | 9 parts |
| Triethanolamine | 1 part |
| OLFINE E1010 (trade name, manufactured by Nisshin Chemical Co., Ltd.) | 1 part |
| Tripropylene glycol monomethyl ether (SP value = 20.4) | 9 parts |
| Ion exchanged water | 34 parts |

The pH of the obtained water-based ink (sample 2) was 8.2 as measured using a pH meter WM-50EG (trade name, manufactured by TOA ELECTRIC INDUSTRIAL CO., LTD.).

(2) Preparation of Samples 1 and 3 to 10

Dispersions of resin-coated pigment particles (pigment dispersions P-1 and P-3 to P-10) and water-based inks (samples 1 and 3 to 10) were prepared in the same manner as in the sample 2, except that the dispersion polymer B-2 was changed to each dispersion polymer (B) shown in Table 1 in the preparation of the sample 2.

(3) Preparation of Samples 11 to 50

Dispersions of resin-coated pigment particles (pigment dispersions P-11 to P-50) and water-based inks (samples 11 to 50) were prepared in the same manner as in the sample 2, except that the dispersion polymer B-2 was changed to each dispersion polymer (B) shown in Table 1 in the preparation of the sample 2.

(4) Preparation of Samples 51 to 58

Dispersions of resin-coated pigment particles (pigment dispersions P-51 to P-58) and water-based inks (samples 51 to 58) were prepared in the same manner as in the sample 2, except that the dispersion polymer B-2 was changed to each dispersion polymer (B) shown in Table 1 in the preparation of the sample 2.

The neutralization degree of the dispersion polymer in the pigment dispersion of each sample was adjusted by adjusting the addition amount of the aqueous 1N NaOH solution. In this regard, the addition amount of the aqueous 1N NaOH solution was determined based on the intended neutralization degree of the dispersion polymer, the acid value of the dispersion polymer, and the addition amount of the dispersion polymer.

[Evaluation]

The following evaluation was performed for each water-based ink prepared as described above. The evaluation results are shown in Table 1.

(1) Average Particle Diameter 10 ml of ion exchanged water was added to 10 µl of each ink composition to prepare a measurement solution. Then, the D95 particle diameter was measured at 25° C. by a dynamic light scattering method using a nano track particle size distribution meter UPA-EX150 (trade name, manufactured by Nikkiso Co., Ltd.). The D95 refers to a particle diameter in which the cumulative particle diameter distribution (based on the volume) from the small particle diameter side is 95%.

(2) Ink Precipitation Properties

Each of the obtained water-based inks was put in a container having a length of 10 cm, a width of 10 cm, and a height of 20 cm or 50 cm. The container was sealed, and then allowed to stand at room temperature (25° C.) for 1 month (1 M) to 3 months (3 M). After allowed to stand, each of the vicinity of the liquid surface (2 cm from the liquid surface) and the vicinity of the liquid bottom (2 cm from the liquid bottom) of the water-based ink was sampled. Then, the number of coarse particles, the average particle diameter, and the spectral absorption in the vicinity of the liquid surface and the vicinity of the liquid bottom were measured, the differences thereof were determined, and then the ink was evaluated in accordance with the following evaluation criteria.

The details of the measurement of the number of coarse particles, the average particle diameter, and the spectral absorption are as follows.

Number of coarse particles: The number of coarse particles having a diameter of 5 µm or more was measured using a Flow particle image analyzer FPIA3000 (trade name, manufactured by SYSMEX CORPORATION).

Average particle diameter: The average particle diameter D95 was measured by a dynamic light scattering method using a nano track particle size dispersion meter UPA-EX150 (trade name, manufactured by Nikkiso Co., Ltd.).

Spectral absorption: A 10000-fold diluted solution was measured using an ultraviolet and visible spectrophotometer SHIMADZU UV-2450 (trade name, manufactured by Shimadzu Corp.).

<Evaluation Criteria>
AAA: The difference in the number of coarse particles was less than 3000, the difference in the average particle diameter was less than 2 nm, and the difference in the spectral absorption was less than 1%, and the precipitation of the dispersed particles in the ink was not observed.
AA: The difference in the number of coarse particles was from 3000 to less than 5000, the difference in the average particle diameter was from 2 nm to less than 4 nm, and the difference in the spectral absorption was from 1% to less than 2%, and the precipitation of the dispersed particles in the ink was hardly observed by visual observation.
A: The difference in the number of coarse particles was from 5000 to less than 7000, the difference in the average particle diameter was from 4 nm to less than 6 nm, and the difference in the spectral absorption was from 2% to less than 3%, and the precipitation of the dispersed particles in the ink was very slightly observed but did not cause problems for practical application.
B: The difference in the number of coarse particles was from 7000 to less than 9000, the difference in the average particle diameter was from 6 nm to less than 8 nm, and the difference in the spectral absorption was from 3% to less than 4%, and the precipitation of the dispersed particles in the ink was slightly observed.
C: The difference in the number of coarse particles was 10000 or more, the difference in the average particle diameter was 8 nm or more, and the difference in the spectral absorption was 4% or more, and the precipitation of the dispersed particles in the ink was considerably observed and caused problems for practical application.

(3) White Deletion

Each of the obtained water-based inks was stored at 50° C. for 3 months. The water-based ink before and after the storage and a treatment liquid having the following composition were charged in an inkjet printer (with a trial print head of 600 dpi having 256 nozzles). Then, using the inkjet printer, the treatment liquid was first applied onto an FX-L paper (trade name, manufactured by Fuji Xerox Co., Ltd.), and then the water-based ink was jetted, thereby forming a 100% coverage pattern. Another unprinted FX-L paper (manufactured by Fuji Xerox Co., Ltd.) was pressed against the pattern formation side of the recorded matter on which the pattern was formed at a load of $4.9 \times 10^4$ N/m², and then the pattern formation side of the recorded matter was subjected to sensory evaluation by visual observation and evaluated in accordance with the following evaluation criteria as compared with a predetermined boundary sample.

<Evaluation Criteria>
A: The occurrence of white deletion was not observed.
B: The number of white deletion was 3 to 10.
C: The number of white deletion exceeded 10.

-Preparation of Treatment Liquid-

The components of the following composition were mixed to prepare a treatment liquid. The pH (25° C.) of the treatment liquid was 1.21 as measured by a pH meter WM-50EG (trade name, manufactured by TOA ELECTRIC INDUSTRIAL CO., LTD.).

<Composition>

| | |
|---|---|
| Malonic acid (aggregating agent) | 7.5 g |
| SANNIX GP 250 | 10 g |
| (trade name, manufactured by Sanyo Chemical Industries, Ltd., polypropylene glycol glyceryl ether) | |
| Ion exchanged water | 7.5 g |

TABLE 1

| | | Dispersion polymer (B) | | | | | | |
|---|---|---|---|---|---|---|---|---|
| | Pigment dispersion | Type | Acid value [mg KOH/g] | Type of hydrophobic monomer | Content ratio of aromatic ring (*1) [% by mass] | Molecular weight | Solubility [g] | Neutralization degree [%] | Product |
| Sample 1 | P-1 | B-1 | 88.0 | Phenoxyethyl methacrylate | 18.91 | 33600 | 0.1 | 50 | 4400 |
| Sample 2 | P-2 | B-2 | 140.3 | Phenoxyethyl methacrylate | 18.91 | 41000 | 0.3 | 50 | 7000 |
| Sample 3 | P-3 | B-2 | 140.3 | Phenoxyethyl methacrylate | 18.91 | 41000 | 0.3 | 50 | 7000 |
| Sample 4 | P-4 | B-3 | 130.2 | Phenoxyethyl methacrylate | 18.91 | 37000 | 0.4 | 50 | 6500 |
| Sample 5 | P-5 | B-4 | 190.2 | Phenoxyethyl methacrylate | 18.91 | 45000 | 0.9 | 50 | 9500 |
| Sample 6 | P-6 | B-2 | 140.3 | Phenoxyethyl methacrylate | 18.91 | 41000 | 0.3 | 50 | 7000 |
| Sample 7 | P-7 | B-5 | 117.8 | Benzyl methacrylate | 17.5 | 42400 | 0.3 | 50 | 5900 |
| Sample 8 | P-8 | B-5 | 117.8 | Benzyl methacrylate | 17.5 | 42400 | 0.3 | 50 | 5900 |
| Sample 9 | P-9 | B-6 | 122.7 | Ethyl methacrylate | 18.0 | 38000 | 0.3 | 50 | 6100 |
| Sample 10 | P-10 | B-6 | 122.7 | Ethyl methacrylate | 18.0 | 38000 | 0.3 | 50 | 6100 |
| Sample 11 | P-11 | B-7 | 84.2 | Phenoxyethyl methacrylate | 18.91 | 33600 | 0.1 | 60 | 5100 |
| Sample 12 | P-12 | B-8 | 97.5 | Phenoxyethyl methacrylate | 18.91 | 41000 | 0.3 | 60 | 5900 |
| Sample 13 | P-13 | B-8 | 97.5 | Phenoxyethyl methacrylate | 18.91 | 41000 | 0.3 | 60 | 5900 |
| Sample 14 | P-14 | B-9 | 102.6 | Phenoxyethyl methacrylate | 18.91 | 35000 | 0.4 | 60 | 6200 |

TABLE 1-continued

| | | | | | | | | | |
|---|---|---|---|---|---|---|---|---|---|
| Sample 15 | P-15 | B-10 | 155.5 | Phenoxyethyl methacrylate | 18.91 | 45000 | 0.9 | 60 | 9300 |
| Sample 16 | P-16 | B-8 | 97.5 | Phenoxyethyl methacrylate | 18.91 | 41000 | 0.3 | 60 | 5900 |
| Sample 17 | P-17 | B-9 | 102.5 | Benzyl methacrylate | 17.5 | 42400 | 0.3 | 60 | 6200 |
| Sample 18 | P-18 | B-9 | 102.5 | Benzyl methacrylate | 17.5 | 42400 | 0.3 | 60 | 6200 |
| Sample 19 | P-19 | B-10 | 155.5 | Ethyl methacrylate | 18.0 | 38000 | 0.3 | 60 | 9300 |
| Sample 20 | P-20 | B-10 | 155.5 | Ethyl methacrylate | 18.0 | 38000 | 0.3 | 60 | 9300 |
| Sample 21 | P-21 | B-11 | 75.3 | Phenoxyethyl methacrylate | 18.91 | 33600 | 0.1 | 70 | 5300 |
| Sample 22 | P-22 | B-12 | 97.8 | Phenoxyethyl methacrylate | 18.91 | 41000 | 0.3 | 70 | 6800 |
| Sample 23 | P-23 | B-12 | 97.8 | Phenoxyethyl methacrylate | 18.91 | 41000 | 0.3 | 70 | 6800 |
| Sample 24 | P-24 | B-13 | 108.9 | Phenoxyethyl methacrylate | 18.91 | 37000 | 0.4 | 70 | 7600 |
| Sample 25 | P-25 | B-14 | 130.3 | Phenoxyethyl methacrylate | 18.91 | 45000 | 0.9 | 70 | 9100 |
| Sample 26 | P-26 | B-12 | 97.8 | Phenoxyethyl methacrylate | 18.91 | 41000 | 0.3 | 70 | 6800 |
| Sample 27 | P-27 | B-15 | 85.7 | Benzyl methacrylate | 17.5 | 42400 | 0.3 | 70 | 6000 |
| Sample 28 | P-28 | B-15 | 85.7 | Benzyl methacrylate | 17.5 | 42400 | 0.3 | 70 | 6000 |
| Sample 29 | P-29 | B-16 | 94.3 | Ethyl methacrylate | 18.0 | 38000 | 0.3 | 70 | 6600 |
| Sample 30 | P-30 | B-16 | 94.3 | Ethyl methacrylate | 18.0 | 38000 | 0.3 | 70 | 6600 |
| Sample 31 | P-31 | B-17 | 70.9 | Phenoxyethyl methacrylate | 18.91 | 33600 | 0.1 | 80 | 5700 |
| Sample 32 | P-32 | B-18 | 97.5 | Phenoxyethyl methacrylate | 18.91 | 41000 | 0.3 | 80 | 7800 |
| Sample 33 | P-33 | B-18 | 97.5 | Phenoxyethyl methacrylate | 18.91 | 41000 | 0.3 | 80 | 7800 |
| Sample 34 | P-34 | B-19 | 110.0 | Phenoxyethyl methacrylate | 18.91 | 37000 | 0.4 | 80 | 8800 |
| Sample 35 | P-35 | B-20 | 120.4 | Phenoxyethyl methacrylate | 18.91 | 45000 | 0.9 | 80 | 9600 |
| Sample 36 | P-36 | B-18 | 97.5 | Phenoxyethyl methacrylate | 18.91 | 41000 | 0.3 | 80 | 7800 |
| Sample 37 | P-37 | B-19 | 110.0 | Benzyl methacrylate | 17.5 | 42400 | 0.3 | 80 | 8800 |
| Sample 38 | P-38 | B-19 | 110.0 | Benzyl methacrylate | 17.5 | 42400 | 0.3 | 80 | 8800 |
| Sample 39 | P-39 | B-20 | 120.4 | Ethyl methacrylate | 18.0 | 38000 | 0.3 | 80 | 9600 |
| Sample 40 | P-40 | B-20 | 120.4 | Ethyl methacrylate | 18.0 | 38000 | 0.3 | 80 | 9600 |
| Sample 41 | P-41 | B-21 | 54.2 | Phenoxyethyl methacrylate | 18.91 | 33600 | 0.1 | 90 | 4900 |
| Sample 42 | P-42 | B-22 | 90.2 | Phenoxyethyl methacrylate | 18.91 | 41000 | 0.3 | 90 | 8100 |
| Sample 43 | P-43 | B-22 | 90.2 | Phenoxyethyl methacrylate | 18.91 | 41000 | 0.3 | 90 | 8100 |
| Sample 44 | P-44 | B-23 | 97.8 | Phenoxyethyl methacrylate | 18.91 | 37000 | 0.4 | 90 | 8800 |
| Sample 45 | P-45 | B-24 | 110.8 | Phenoxyethyl methacrylate | 18.91 | 45000 | 0.9 | 90 | 10000 |
| Sample 46 | P-46 | B-22 | 90.2 | Phenoxyethyl methacrylate | 18.91 | 41000 | 0.3 | 90 | 8100 |
| Sample 47 | P-47 | B-25 | 92.8 | Benzyl methacrylate | 17.5 | 42400 | 0.3 | 90 | 8400 |
| Sample 48 | P-48 | B-25 | 92.8 | Benzyl methacrylate | 17.5 | 42400 | 0.3 | 90 | 8400 |
| Sample 49 | P-49 | B-26 | 96.3 | Ethyl methacrylate | 18.0 | 38000 | 0.3 | 90 | 8700 |
| Sample 50 | P-50 | B-26 | 96.3 | Ethyl methacrylate | 18.0 | 38000 | 0.3 | 90 | 8700 |
| Sample 51 | P-51 | B-27 | 112.4 | Phenoxyethyl methacrylate | 18.91 | 41000 | 0.3 | 40 | 4500 |
| Sample 52 | P-52 | B-28 | 110.3 | Phenoxyethyl methacrylate | 18.91 | 35000 | 0.4 | 40 | 4400 |
| Sample 53 | P-53 | B-29 | 97.5 | Phenoxyethyl methacrylate | 18.91 | 41000 | 0.3 | 100 | 9800 |
| Sample 54 | P-54 | B-30 | 95.5 | Phenoxyethyl methacrylate | 18.91 | 37000 | 0.4 | 100 | 9600 |

TABLE 1-continued

| Sample 55 | P-55 | B-31 | 89.5 | Phenoxyethyl methacrylate | 18.91 | 89200 | 0.3 | 80 | 7200 |
| Sample 56 | P-56 | B-32 | 97.8 | Phenoxyethyl methacrylate | 18.91 | 18000 | 0.3 | 80 | 7800 |
| Sample 57 | P-57 | B-33 | 90.2 | phenoxyethyl methacrylate | 22 | 41000 | 0.3 | 80 | 8100 |
| Sample 58 | P-58 | B-34 | 90.2 | phenoxyethyl methacrylate | 9 | 41000 | 0.3 | 80 | 8100 |

| | | Precipitation properties evaluation | | | | |
|---|---|---|---|---|---|---|
| | D95 | Storage period (*2) | Storage container (Length + Width + Height) [cm] | evaluation | white deletion evaluation | Remarks |
| Sample 1 | 250.3 | 1M | 40 | C | C | Comp. Ex. |
| Sample 2 | 197.5 | 1M | 40 | AA | A | Present invention |
| Sample 3 | 197.5 | 1M | 70 | AA | A | Present invention |
| Sample 4 | 185.9 | 1M | 40 | AA | A | Present invention |
| Sample 5 | 225.6 | 1M | 40 | C | B | Comp. Ex. |
| Sample 6 | 197.5 | 3M | 40 | A | A | Present invention |
| Sample 7 | 200.7 | 1M | 40 | A | A | Present invention |
| Sample 8 | 200.7 | 3M | 40 | A | A | Present invention |
| Sample 9 | 199.3 | 1M | 40 | A | A | Present invention |
| Sample 10 | 199.3 | 3M | 40 | A | A | Present invention |
| Sample 11 | 234.2 | 1M | 40 | C | C | Comp. Ex. |
| Sample 12 | 186.7 | 1M | 40 | AA | A | Present invention |
| Sample 13 | 186.7 | 1M | 70 | AA | A | Present invention |
| Sample 14 | 183.2 | 1M | 40 | AA | A | Present invention |
| Sample 15 | 212 | 1M | 40 | B | B | Comp. Ex. |
| Sample 16 | 186.7 | 3M | 40 | AA | A | Present invention |
| Sample 17 | 183.2 | 1M | 40 | A | A | Present invention |
| Sample 18 | 183.2 | 3M | 40 | B | B | Present invention |
| Sample 19 | 212 | 1M | 40 | A | A | Present invention |
| Sample 20 | 212 | 3M | 40 | B | B | Present invention |
| Sample 21 | 204.5 | 1M | 40 | B | B | Comp. Ex. |
| Sample 22 | 187.6 | 1M | 40 | AAA | A | Present invention |
| Sample 23 | 187.6 | 1M | 70 | AAA | A | Present invention |
| Sample 24 | 195.5 | 1M | 4 | AA | A | Present invention |
| Sample 25 | 216.6 | 1M | 4 | B | B | Comp. Ex. |
| Sample 26 | 187.6 | 3M | 4 | AA | A | Present invention |
| Sample 27 | 198.9 | 1M | 4 | A | A | Present invention |
| Sample 28 | 198.9 | 3M | 4 | B | A | Present invention |
| Sample 29 | 204.6 | 1M | 4 | A | A | Present invention |
| Sample 30 | 204.6 | 3M | 4 | B | A | Present invention |
| Sample 31 | 243.5 | 1M | 40 | B | C | Comp. Ex. |
| Sample 32 | 191.3 | 1M | 40 | AAA | A | Present invention |

TABLE 1-continued

| | | | | | | | |
|---|---|---|---|---|---|---|---|
| Sample 33 | 191.3 | 1M | 70 | AAA | A | Present invention |
| Sample 34 | 186.6 | 1M | 40 | AAA | A | Present invention |
| Sample 35 | 243.6 | 1M | 40 | C | C | Comp. Ex. |
| Sample 36 | 191.3 | 3M | 40 | AA | A | Present invention |
| Sample 37 | 210.3 | 1M | 40 | A | A | Present invention |
| Sample 38 | 210.3 | 3M | 40 | A | A | Present invention |
| Sample 39 | 243.6 | 1M | 40 | A | A | Present invention |
| Sample 40 | 243.6 | 3M | 40 | B | A | Present invention |
| Sample 41 | 218.6 | 1M | 40 | B | B | Comp. Ex. |
| Sample 42 | 186.4 | 1M | 40 | AAA | A | Present invention |
| Sample 43 | 186.4 | 1M | 70 | AAA | A | Present invention |
| Sample 44 | 194.9 | 1M | 40 | AA | A | Present invention |
| Sample 45 | 215.6 | 1M | 40 | C | B | Comp. Ex. |
| Sample 46 | 186.4 | 3M | 40 | AA | A | Present invention |
| Sample 47 | 221.7 | 1M | 40 | B | A | Present invention |
| Sample 48 | 221.7 | 3M | 40 | B | A | Present invention |
| Sample 49 | 215.8 | 1M | 40 | B | A | Present invention |
| Sample 50 | 215.8 | 3M | 40 | B | A | Present invention |
| Sample 51 | 253.2 | 1M | 40 | C | C | Comp. Ex. |
| Sample 52 | 212.6 | 1M | 40 | C | C | Comp. Ex. |
| Sample 53 | 240.8 | 3M | 40 | C | C | Comp. Ex. |
| Sample 54 | 219.6 | 3M | 40 | C | C | Comp. Ex. |
| Sample 55 | 184.2 | 1M | 40 | AA | A | Present invention |
| Sample 56 | 219.6 | 1M | 40 | B | B | Present invention |
| Sample 57 | 230.2 | 1M | 40 | C | C | Comp. Ex. |
| Sample 58 | 255 | 1M | 40 | C | C | Comp. Ex. |

*1: Content ratio of the aromatic ring in the polymer (B) based on the total mass of the polymer
*2: "M" in the column of the Storage Period represents the number of months.

As shown in Table 1, in the Examples, the diameter of the dispersed particles of the pigment was fine, the stability over time was excellent, and even after a long period of time had passed in the form of a water-based ink, precipitation did not occur. Also, when stored in a large container, precipitation did not occur after a long period of time and the ink composition was capable of being used without shaking Furthermore, the water-based inks of the Examples suppressed a white deletion defect when jetted.

In contrast, with the comparative water-based inks, the stability over a long period of time was poor and a white deletion defect was not suppressed.

All publications, patent applications, and technical standards mentioned in this specification are herein incorporated by reference to the same extent as if each individual publication, patent application, or technical standard was specifically and individually indicated to be incorporated by reference.

What is claimed is:

1. An aqueous pigment dispersion comprising:
  (A) a pigment;
  (B) a dispersion polymer having a neutralization degree of from 50% to 90% and a solubility of from 0.2 g to 0.8 g per 5 ml of water (25° C.), and containing an acidic group and a hydrophobic structural unit (a) having an aromatic ring linked via a linking group to an atom included in a main chain, a content ratio of the aromatic ring being from 10% by mass to less than 20% by mass based on a total mass of the polymer, wherein an acid value of the dispersion polymer (B) is from 85 mgKOH/g to 165 mgKOH/g; and
  (C) a water-based liquid medium.

2. The aqueous pigment dispersion according to claim 1, wherein the hydrophobic structural unit (a) contains a structural unit represented by the following Formula (1):

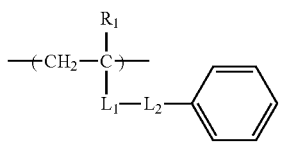

Formula (1)

wherein $R_1$ represents a hydrogen atom, a methyl group, or a halogen atom; $L_1$ represents *—COO—, *—OCO—, *—CONR$_2$—, *—O—, or a substituted or unsubstituted phenylene group; $R_2$ represents a hydrogen atom or an alkyl group having 1 to 10 carbon atoms; $L_2$ represents a single bond or a divalent linking group having 1 to 30 carbon atoms; and the symbol * in the group represented by $L_1$ represents a connecting point with the main chain.

3. The aqueous pigment dispersion according to claim 1, wherein the dispersion polymer (B) has a product of an acid value (mgKOH/g) and the neutralization degree (%) of from 5,000 to 15,000.

4. The aqueous pigment dispersion according to claim 1, wherein a weight average molecular weight of the dispersion polymer (B) is 30,000 or more.

5. The aqueous pigment dispersion according to claim 1, wherein the pigment (A) is an azo yellow pigment.

6. An ink composition comprising the aqueous pigment dispersion according to claim 1.

7. The ink composition according to claim 6, further comprising a water-soluble organic solvent having an SP value of 27.5 or less.

8. An image forming method comprising:
applying the ink composition according to claim 6 onto a recording medium by an inkjet method;
applying a treatment liquid containing an acidic compound that aggregates components in the ink composition onto the recording medium; and
contacting the ink composition with the treatment liquid to form an image.

9. The image forming method according to claim 8, wherein the ink composition, charged in a container having a sum of a length, a width, and a height of 40 cm or more, is applied onto the recording medium.

10. The image forming method according to claim 8, wherein the ink composition is applied onto the recording medium after the treatment liquid is applied onto the recording medium, thereby forming the image.

11. The aqueous pigment dispersion according to claim 1, wherein the pigment is at least partially covered with the dispersion polymer.

\* \* \* \* \*